United States Patent
Brooks et al.

(10) Patent No.: US 6,854,585 B2
(45) Date of Patent: Feb. 15, 2005

(54) MULTIDIRECTIONAL PART TRANSPORTER AND SORTER

(76) Inventors: David Brooks, 5031 Nighthawk Way, Oceanside, CA (US) 92056; Mark Brooks, 1841 Blackhawk Ave., Oceanside, CA (US) 92056

( * ) Notice: Subject to any disclaimer, the term of this patent is extended or adjusted under 35 U.S.C. 154(b) by 7 days.

(21) Appl. No.: 10/322,217

(22) Filed: Dec. 17, 2002

(65) Prior Publication Data

US 2004/0112712 A1 Jun. 17, 2004

(51) Int. Cl.$^7$ .................. B65G 47/24; B65G 27/00; B65G 27/16
(52) U.S. Cl. .................. 198/394; 198/752.1; 198/766
(58) Field of Search .................. 198/394, 752.1, 198/753, 761, 762, 763, 766

(56) References Cited

U.S. PATENT DOCUMENTS

| | | | | |
|---|---|---|---|---|
| 4,128,159 A | * | 12/1978 | Pataki | .................. 198/392 |
| 4,849,156 A | * | 7/1989 | Durow et al. | ............... 376/261 |
| 5,205,395 A | * | 4/1993 | Bruno et al. | ................. 198/762 |
| 6,044,710 A | * | 4/2000 | Kurita et al. | ............. 198/752.1 |
| 6,230,875 B1 | * | 5/2001 | Carlyle | ........................ 198/761 |

* cited by examiner

Primary Examiner—Gene O. Crawford
(74) Attorney, Agent, or Firm—Henri J. A. Charmasson; John D. Buchaca

(57) ABSTRACT

A directional small part transporter and sorter simultaneously imparts upon a part-carrying platen reciprocating movements along one or two horizontal axis perpendicular to each other and a third vertical axis. A stack of slidingly coupled carriages are each independently driven by a stepping motor. Each motor is coupled to a carriage by means of a mechanism that translates the rotation of the motor into a linear translation of the coupled carriage by means of a worm screw or transmission belt. An electronic module controlled by a data processor allows for adjustment of the duration, amplitude, frequency and phase relationship of the three periodical movements of the platen. A part reservoir along the platen can be either raised to deliver parts onto the platen or lowered below the platen ledge to receive parts off the platen. The transporter and sorter may be used in connection with various electronic component manufacturing processes.

26 Claims, 7 Drawing Sheets

MULTIDIRECTIONAL PART TRANSPORTER AND SORTER

FIELD OF THE INVENTION

This invention relates to automated light equipment used in the manufacture, sorting and testing of small objects, and more particularly, to small articles, transporter and sorters for electronic components, fasteners and other hardware parts, grains and other small food items and generally many small manufacturing parts.

BACKGROUND OF THE INVENTION

U.S. Pat. No. 5,205,395 Bruno et al., which is incorporated herein by this reference, discloses a vibratory movement apparatus particularly adapted to transportation, orientation, sorting and loading of miniature electronic components. In such an apparatus, reciprocating movements are imparted upon a platen carrying the components in one or two horizontal directions and a vertical direction. Solenoids are used to vibrate the independently translatable carriages supporting the platen in cooperation with returning springs. In such an apparatus, the resonance frequencies of the driving mechanism, particularly the springs, create harmonic resonance problems that significantly reduce the range of frequencies at which the platen can be made to vibrate. Moreover, the mass of the moving components introduces substantial inertia that also affects the usable range of frequencies and the response time of the mechanism.

Vibration tables have been used to minimize the tedious tasks of manually sorting and processing small electronic components such as capacitors and resistors. As disclosed in the referenced patent, a platen has a planar upper surface upon which the components to be sorted are allowed to randomly travel. The platen has bores, shaped and dimensioned to only accept components in one direction, typically longitudinally. Once all the bores in the platen have been filled, the components remaining on the top surface are removed. The components can then be processed while on the platen, or they can be pushed through the platen into a multi-cavity receiving matrix made of resilient material that can hold the components while they are dipped into an electrically conductive solution to create terminals upon the exposed part of the components or for other applicable processes.

Heretofore, the removal of the platen from the vibration table, the transfer to the multi-cavity matrix and most of the subsequent processing steps have been done manually. So have been the processes of placing the components upon the platen and collecting the excess components.

The excess inertia and resonance susceptibility of the prior art sorting equipment have imposed several restrictions upon the manipulation of parts such as the ability to impart upon the part complex multidirectional or circuitous travel paths, weight or density-based separation, consistent reorientation and other movements which require more complex variations in the frequency amplitude and phase relationship of the vibrating impulses.

The instant invention results from attempts to resolve the aforesaid problems in prior art transporting and sorting equipment and to reduce or suppress some of the manipulative tests involved in the manufacture of electronic parts.

SUMMARY OF THE INVENTION

The principal object of this invention is to provide equipment to enhance automatization in the manufacture of electronic components and more specifically to facilitate the handling and processing of miniature parts.

A more specific object of this invention is to provide a small part carrier and sorter that allows for automated selection, orientation, transfer, and mass handling of small parts under a large variety of iterations with minimum human intervention.

These and other valuable objects are achieved by a data processor-controlled vibrating handler in which a platen upon which can be dumped a number of components is vibrated along multiple axes in a variety of adjustable patterns and sequences that provide for a multidirectional translation of the components along circuitous paths as well as their separation by size and weight. The platen is supported by three superimposed and independently movable carriages that can impart reciprocating movements about three separate and substantially orthogonal axes. Each carriage is driven by a stepping motor whose amplitude, speed and pattern of movement is controlled by a programmable data processor. The platen is provided with chamfered bores into which the parts fall in a desired orientation. A press having a series of downwardly pointing insertion pins can be positioned over the components resting in the bores and push them through the platen into a cavity matrix which is positioned under the platen by a conveyor then moved away toward other manufacturing machinery. Alternately, the components can be tested and sorted while they are aligned into the platen by use of appropriate probes associated with the pins of the press. The tips of the pins incorporate sensors such as a strain gauge that can signal a jammed component and stop the movement of the press. The data provided by the sensors are fed back to the data processor and used to control the speed of insertion and the amount of pressure applied to the components being inserted. The stepping motors which control the multi-axial vibrations as well as the positioning of the press over the platen are controlled by trains of impulses whose phase relationship, duration and alternating sequence determine the amplitude direction and force of the vibrating movements.

DESCRIPTION OF THE PREFERRED EMBODIMENT OF THE INVENTION

Figure 1:
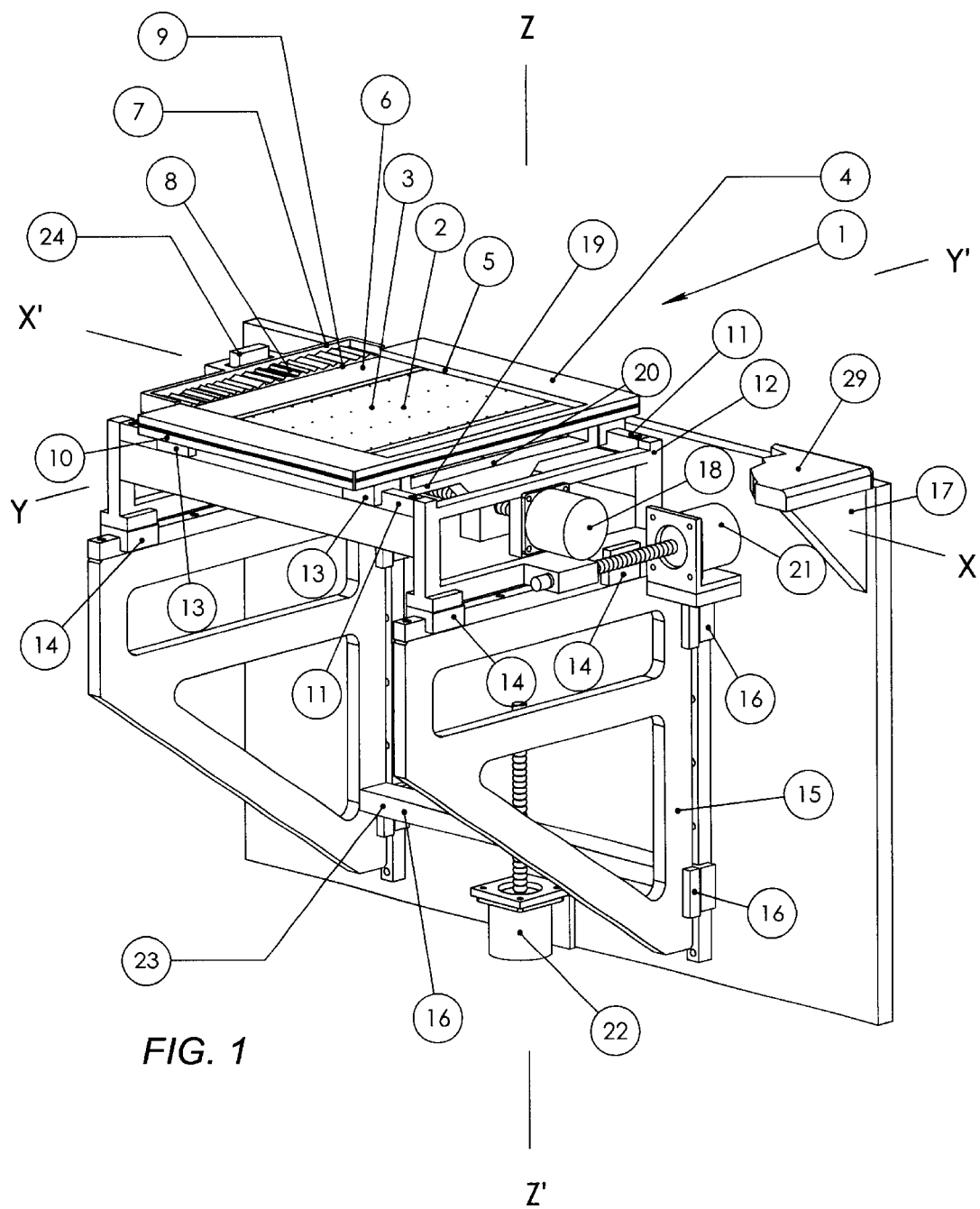
FIG. 1 is a perspective view of a component handler according to the invention.

Referring now to the drawing, there is shown an electronic component handler 1 according to the invention. The handler is specifically designed to process small electronic parts such as miniature capacitors. A platen 2 has a horizontal top planar surface 3 and is mounted on a suitable frame 4. The frame provides a ledge 5 on three sides of the platen leaving an open linear edge 6 on the fourth side of the platen. A reservoir 7 of small components 8 has a linear border 9 running contiguously to the open edge 6 of the platen. The frame 4 and the reservoir 7 are part of the carriage 10 that slides horizontally over a pair of rails 11. The rails themselves are integral parts of a second carriage 12. The rails combine with two pairs of runner blocks 13 such as the one commercially available under the mark BALLRAIL from Rexroth of Charlotte, N.C., to provide sliding support means of the first carriage 10 over the second carriage 12 along a first horizontal axis X–X'. A second set of two pairs of runner blocks 14 similarly support the second carriage 12 over a third carriage 15, and allows the first and second carriages to move horizontally about a second axis Y–Y' which is perpendicular to the first axis X–X'. A third set of two pairs of runner blocks 16 slidingly guide the third carriage 15 on the vertical surface of a stationary base or framework 17 along a third axis Z–Z' perpendicular to both the X–X' and Y–Y' axis.

Fixedly mounted on the second carriage 12 is a first stepping motor 18 axially driving a worm screw 19. The worm screw is engaged into a threaded bore 20 in a section of the first carriage 10. Accordingly, the worm screw and its engagement with the first carriage, provides a way to translate the rotating movement of the first motor 18 into a linear movement of the first carriage about the first axis X–X'. A second stepping motor 21 similarly mounted on the third carriage 15 then coupled to the second carriage 12 can impart a linear movement to the second and first carriage in reference to the third carriage. A third motor 22 is vertically secured to the base 17 and axially drive a worm screw engaging a member 23 of the third carriage. Rotation of the third motor translates into a linear movement of the first, second and third carriages about vertical axis Z–Z'. The reservoir 7 is vertically movable by means of a pneumatic lifter 24 from a low position at which its linear border 9 is below the linear edge 6 of the platen up to a level at least as high as the level of the platen top surface 3. When the reservoir is in an upper position, parts can be transferred from the reservoir onto the platen by appropriate vibrating movement of the first, second or third carriage or a combination of some of them. When the reservoir is in its lower position, components can be cleared off the plate and dumped into the reservoir.

Figure 5:
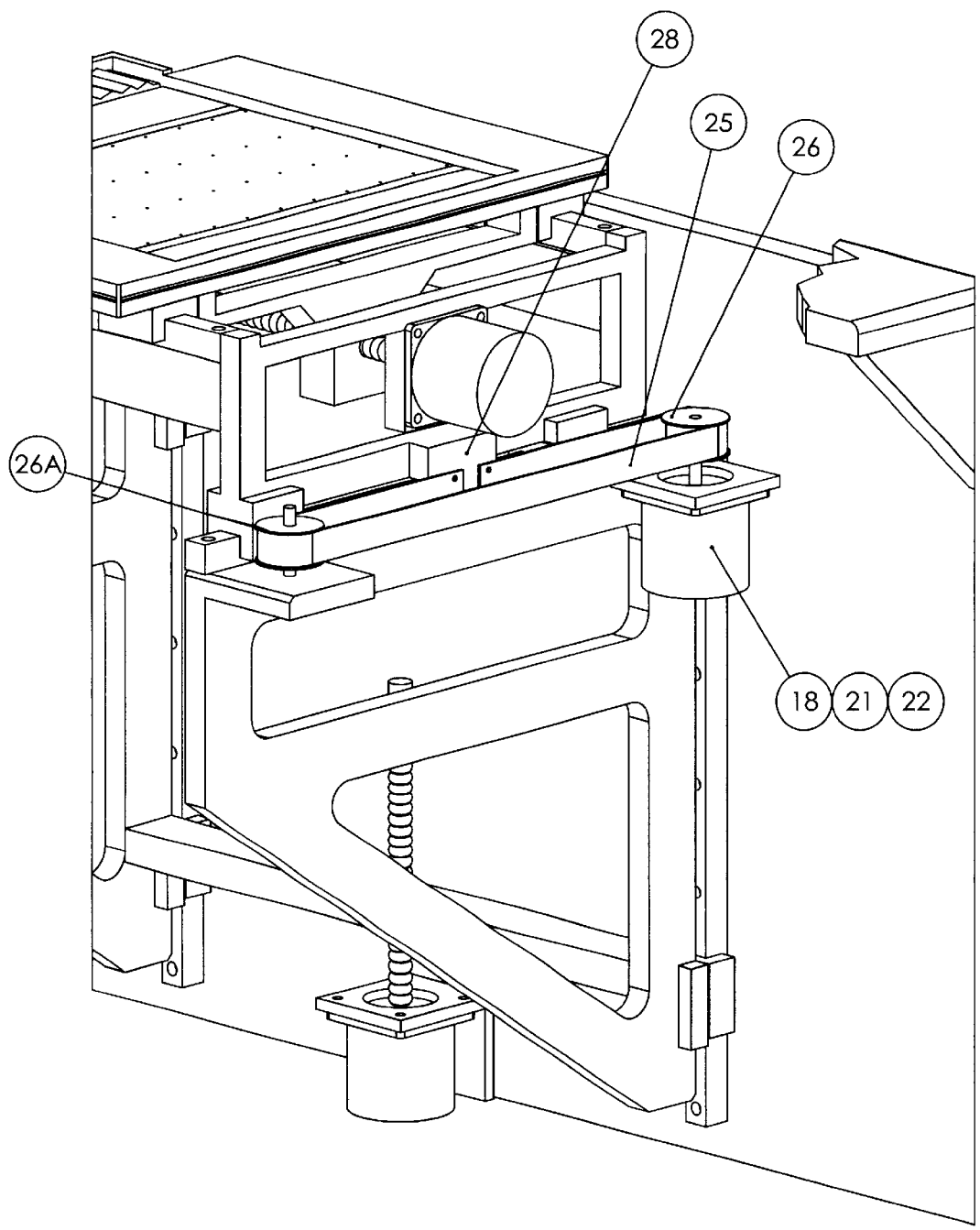
FIG. 5 is a perspective view of a belt implementation of the motor to carriage couplings.

Illustrated in FIG. 5 in connection with the second carriage, is an alternate mechanism that may be used to couple any one of the stepping motors 18, 21, 22 to one of the carriages 10, 12, 15 by means of a transmission belt 25. The belt is radially connected to, and circularly driven by the motor by way of a first pulley 26. The belt is continuous and engages a second pulley 26A spaced apart from the first pulley. A section of the belt between the two pulleys is fixedly attached to a portion 28 of the carriage that has to be moved in reference to the base or to another carriage mounting the motor and the two pulleys.

Figure 4:
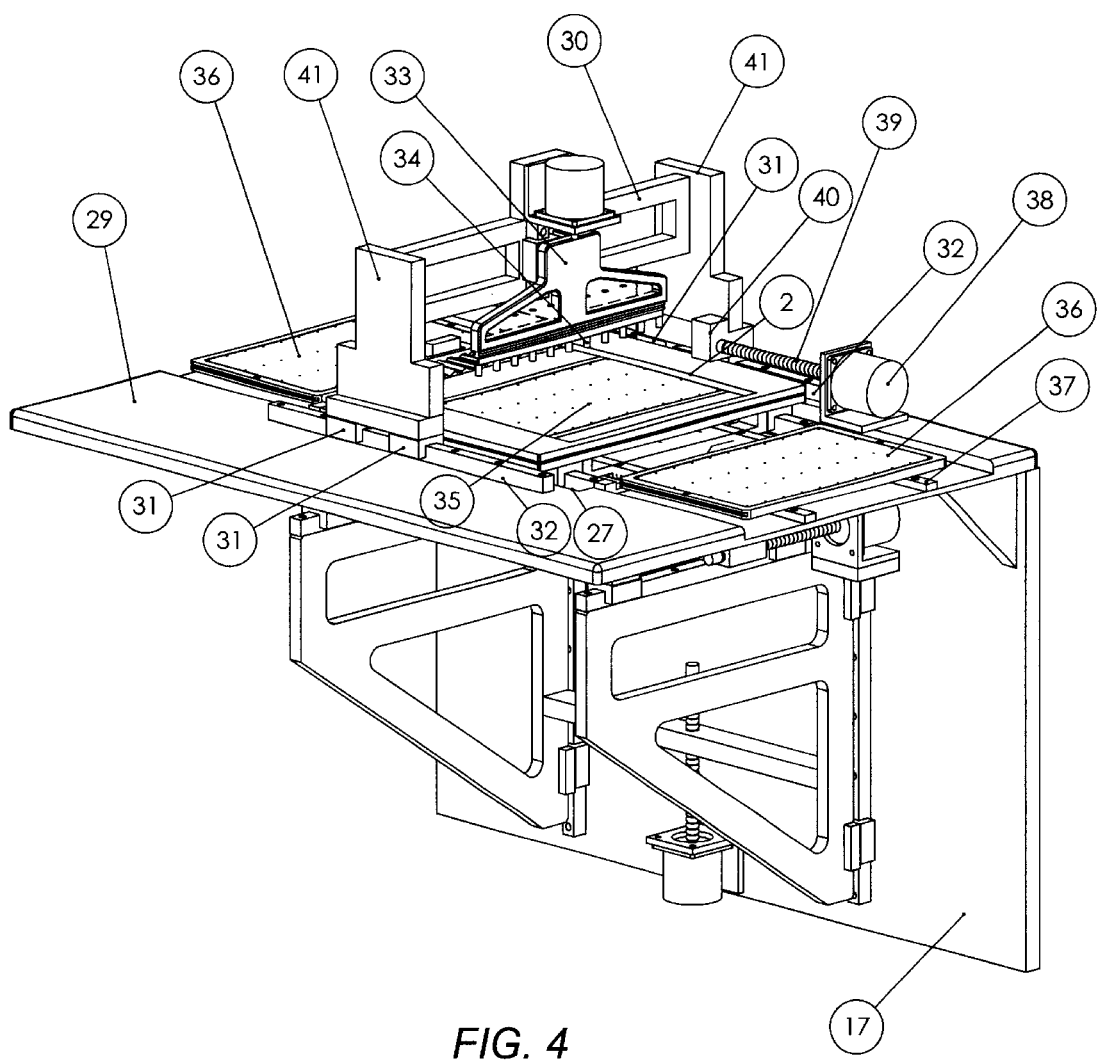
FIG. 4 is a detailed perspective view of an optional inserting press.

Associated in FIG. 4, associated with the base 17 is a table 29 only partially shown in FIG. 1. The table has a central opening 27 framing the three carriages. The table slidingly supports a press 30 above the first carriage and platen. Pairs of runner blocks 31 allow the press to slide horizontally over rails 32 mounted on the table top. Alternately, the press can be stationary and the platen is moved in a matingly aligned position under it. The pressing arm 33 of the press mounts a row of downwardly extending pins 34 whose size and spacing correspond and are able to mate with chamfered bores 35 drilled through the platen 2. Each of the chamfered bores is shaped and dimensioned to receive one component, and hold it in a desired orientation. Typically, components traveling on the top surface of the platen will fall in a tapering bore and automatically orient themselves longitudinally in the vertical position. The pins are shaped and dimensioned to push the components nested into the chamfered bores of the platen through the platen and into a matrix 36 made of some resilient material such as a hard rubber including silicon rubber and having an array of cavities matching the array formed by the chamfered bore in the platen. The matrix is carried by a conventional conveyor 37 that can bring the matrix under and in line with the platen and remove it once components have been pushed out of the platen and into the cavities of the matrix. A fourth stepping motor 38 mounted on the table 29 axially drives a worm screw 39 engaging a part 40 of the press infrastructure 41. Controlled rotation of motor 38 will bring the row of pins 34 in precise alignment with one of the rows of components held in the platen bores 35. Alternately, the pressing arm may be adapted to carry a two-dimensional array of pins to simultaneously push two or more, or even all of the rows of components in the platen. A component-loaded matrix can be carried by the conveyor to a variety of other automatic manufacturing equipment.

Figure 2:
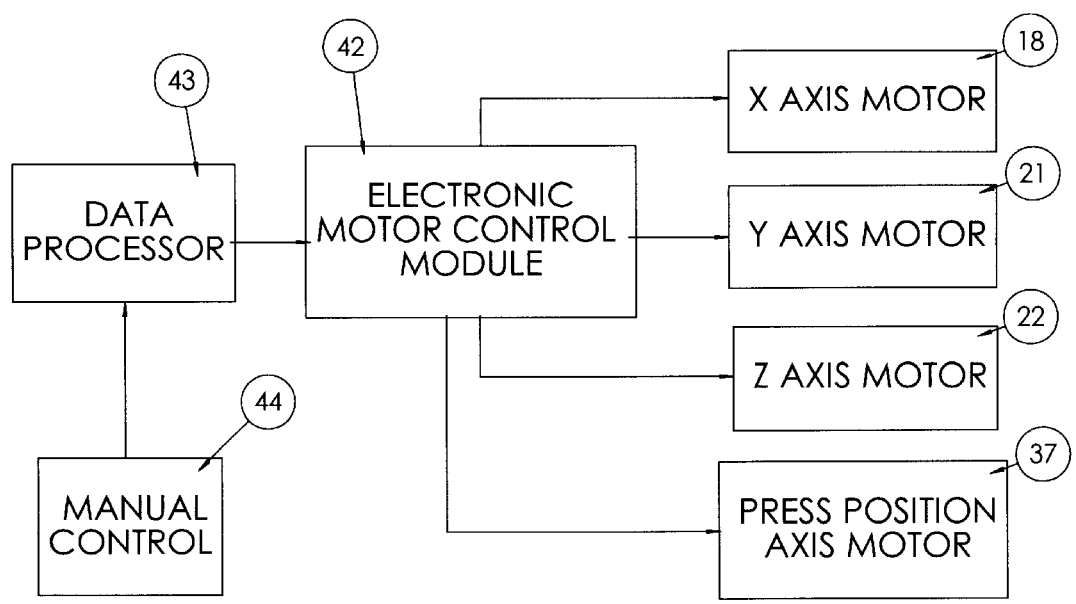
FIG. 2 is a block diagram of the electronic control system.

As more specifically illustrated in FIG. 2, the apparatus comprises an electronic motor control module 42 which includes, among other functional components, bipolar chopping motor drivers well-known by those skilled in the electro-mechanical art to provide bi-directional driving signals to stepping motors.

It is well-known that a stepping motor can be caused to turn along a minute arc upon receipt of a forward or backward coded impulse. Accordingly, a string of such impulses will step the motor across an arc corresponding to the number of impulses time the motor's arcuate resolution. Thus, the amplitude of the motor movement is determined by the number of impulses and its speed by the frequency of the impulse train. The bipolar chopping motor drivers are fed and controlled by a signal generated by a data processor 43 which operates under a number of computer programs written to adjustably set the number and frequency of impulses applied to each of the motors. The computer programs include routines to accept the output of at least one manual control implement 44 such as a keyboard, mouse or joystick. The computer programs are particularly adapted to adjust the phase relationship between the train of impulses fed to the three carriage-driving motors 18, 21, 22.

Figure 3:
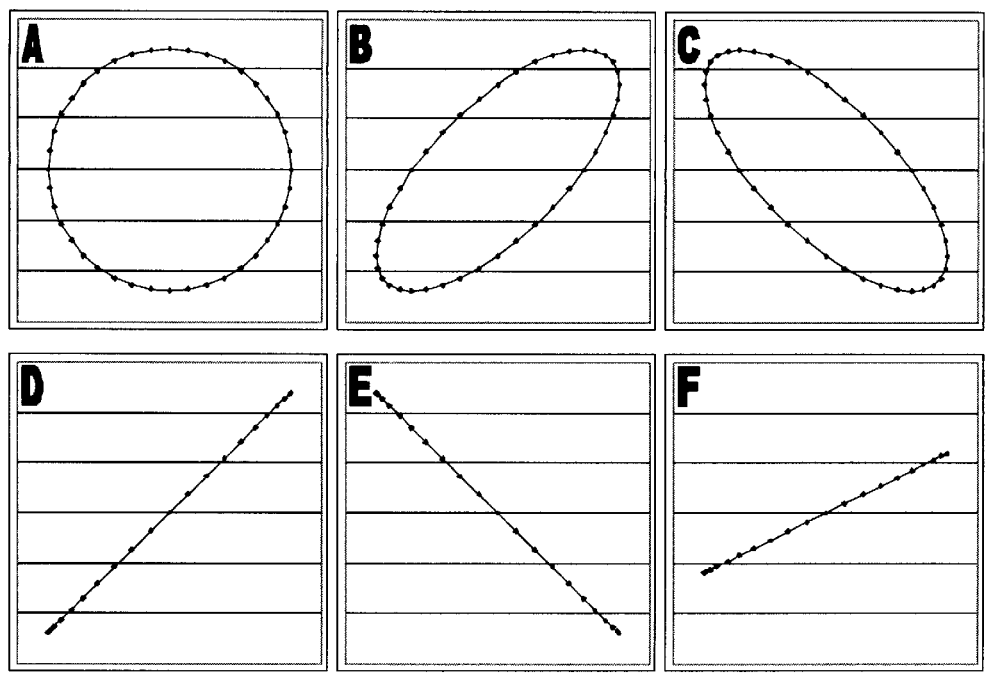
FIG. 3 is a graphical rendering of a number of motion patterns that can be created by the handler.

For instance, if the train of impulses fed to the X axis motor 18 and to the Z axis motor 22 are 90° out of phase, the platen will be imparted a rotary movement illustrated in frame A of FIG. 3. It should be noted that the phase coordination is not between the impulses themselves, but the respective trains of impulses that drive the stepping motors. It should also be noted that forward and backward motions that are created by the trains of impulses are repetitively generated in a choice of sequences that allow for precise directional control of the components riding on the platen. While the rotational movement of the platen illustrated in Frame A of FIG. 3 will not translate the components over the platen, as the phase shift between the sequences of alternating impulse string increases, the movement of the platen begins to assume an elliptical shape which can be tilted toward one of the opposite directions as illustrated in Frames B and C of FIG. 3. The phase shift between the impulse train sequences that control the horizontal and vertical vibrations of the platen can be selectively adjusted along a full 360° range. Therefore, the degree of the elliptical movement of the platen can be adjusted down to zero, at which point the platen movement becomes linear as illustrated in Frames D, E and F of FIG. 3. An aggressive linear movement of the components over the platen can be achieved by increasing the amplitude of the signal fed to the X axis motor in relation to the amplitude of the signal fed to the Z axis motor to yield the movement illustrated in Frame F of FIG. 3.

Figure 6:
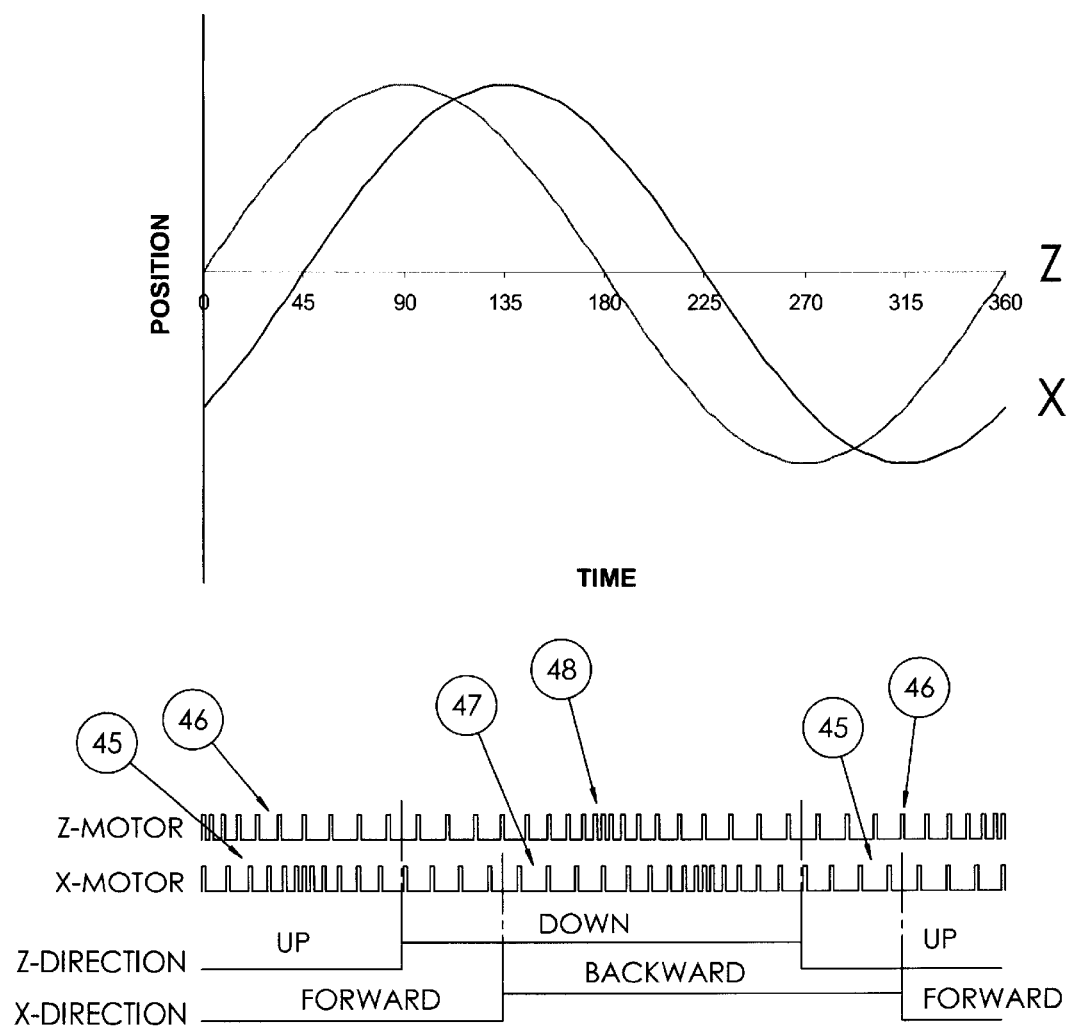
FIG. 6 is a graphical representation of some motor driving signals.

The program routines that shape, i.e., modulate the impulse trains are well-known to those skilled in the electronic and programming arts. By way of illustration, there is shown in FIG. 6, the impulse trains respectively fed to the X and Z motors in order to impart a complete vibration cycle to the platen as illustrated in Frame B of FIG. 3. One can see that the frequency and direction of the impulse trains are derived from, that is modulated, by two sinusoids at a 45° phase angle. If the two sinusoids were in phase, the movement of the platen would be linear as illustrated in Frames E and F of FIG. 3.

It should be understood that the just-described two-axis movement can be combined with a Y axis movement by activating the Y axis motor. Appropriate adjustment between the frequency, amplitude, i.e., length, and duration of the impulse trains under control of the data processing programs and in response to the manipulation of the manual control implement 44 will allow an operator to guide one or more parts in any direction including circuitous paths over the platen. For instance, extra components that have not nested in one of the chamfered bores of the platen can be quickly and conveniently returned to the reservoir. Objects of different sizes or densities can be separated in view of the kinetic energy they can store. Components can be guided around obstacles, and those that do not have a homogeneous configuration can be oriented in any desired direction.

The alternating forward driving sequences of impulses 45, 46 and backward driving sequences 47, 48, although illustrated as separate lines are, in fact, synchronously continuous. The duration of these sequences determines the amplitude of the motor movements. The common frequency of the trains of impulses that impart reciprocating and repetitive horizontal and vertical motions to the platen can be selectively adjusted over a continuous range of 1 to 60 Hertz unimpeded by the resonance problems plaguing the vibrating tables of the prior art.

Figure 7:
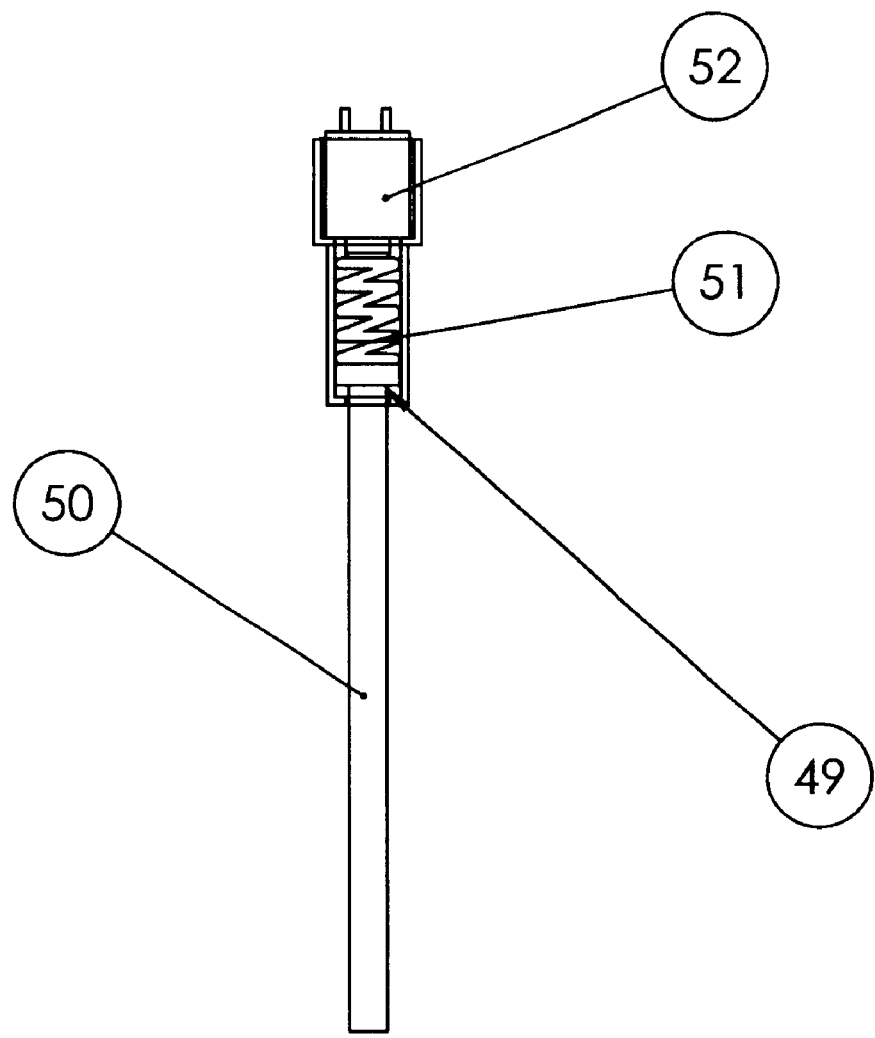
FIG. 7 is a cross-sectional view of an insertion pin tip sensor mechanism.

As illustrated in FIG. 7, the tip 49 of each insertion pin on the press is provided with a contact probe 50 which is biased outwardly by a spring 51. A strain gauge 52 positioned between the probe 50 and the tip 49 responds to the pressure exerted by the pin upon a component. When the pressure exceeds a determined limit indicating that the component is jammed into its receiving bore on the platen, the downward pressure of the press is released.

The type of probe or sensor mounted at the tip of each pin can be adapted to test and sort the components while they are still positioned on the platen. In an alternate configuration, a single gauge may be associated to an entire row of pins.

While the preferred embodiment of the invention has been described, modifications can be made and other embodiments may be devised without departing from the spirit of the invention and the scope of the appended claims.

What is claimed is:

1. An apparatus for transporting and sorting parts which comprises:
   a platen having a planar surface and at least one linear edge;
   a first carriage fixedly mounting said platen;
   a second carriage movably mounting said first carriage;
   means for slidingly supporting said first carriage along a first horizontal axis above said second carriage;
   a supporting framework;
   means, on said framework, for slidingly guiding said second carriage along a vertical axis perpendicular to said first horizontal axis;
   first stepping motor coupled to said first carriage to impart bi-directional translations to said first carriage along said first horizontal axis; and
   second stepping motor coupled to said second carriage to impart bi-directional translations to said second carriage along said vertical axis.

2. The apparatus of claim 1, which further comprises a worm screw axially coupled to at least one of said first and second motors and engaging a threaded bore in at least one of said first and second carriages.

3. The apparatus of claim 1, which further comprises a belt radially coupled to at least one of said first and second motors and secured to at least one of said first and second carriages.

4. The apparatus of claim 1, which further comprises:
   a vertically movable reservoir of parts to be transported across said planar surface, said reservoir having a linear border contiguous to the linear edge of said platen; and
   means for vertically moving said reservoir to lift said border from a level below said border to a level at least even with said edge.

5. The apparatus of claim 1, wherein said platen has a plurality of bores shaped and dimensioned to accept parts moving thereon and hold said parts in a given orientation; and
   which further comprises:
      a press matingly aligned with said platen, said press having a set of downwardly extending pins positioned and dimensioned to push said parts through said bores and into a receiving matrix when said press is activated; and
   means for carrying said matrix under, and away from, said first platen.

6. The apparatus of claim 5, wherein each of said pins comprises a sensing probe tip.

7. The apparatus of claim 1, which further comprises:
   a controllable electronic module simultaneously feeding bi-directional driving signals to said first and second motors; and
   a data processor programmed to control said electronic module.

8. The apparatus of claim 7, wherein said data processor and controllable electronic module comprise:
   computer programs to generate first repetitively alternating sequences of forward and backward driving impulses for said first motor and second repetitively alternating sequences of forward and backward driving impulses for said second motors; and
   means for varying the phase between said first and second sequences.

9. The apparatus of claim 8, wherein said data processing and controllable electronic module further comprise program routines for varying the frequency of said impulses in each of said sequences.

10. The apparatus of claim 8, wherein said data processor and controllable electronic module further comprise program routines for varying the duration of said sequences.

11. The apparatus of claim 1, which further comprises:
    a third carriage interposed between said first and second carriages; and
    means fixedly mounted on said second carriage for slidingly supporting said third carriage along a second horizontal axis perpendicular to said first horizontal axis and said vertical axis.

12. The apparatus of claim 11, which further comprise a worm screw axially coupled to at least one of said first, second and third motors and engaging a threaded bore in at least one of said first, second and third carriages.

13. The apparatus of claim 11, which further comprises a belt radially coupled to at least one of said first, second and third motors and secured to at least one of said first, second and third carriages.

14. The apparatus of claim 11, which further comprises:
   a vertically movable reservoir of parts to be transported across said planar surface, said reservoir having a linear border contiguous with the linear edge of said plate; and
   means for vertically moving said reservoir to lift said border from a level below said border to a level at least even with said edge.

15. The apparatus of claim 11, wherein said platen has a plurality of bores shaped and dimensioned to accept parts moving thereon and hold said part in a given orientation; and
   which includes a press matingly aligned with said platen, said press having a set of downwardly extending pins positioned and dimensioned to push said parts through said bores and into a receiving matrix when said press is activated; and
   means for carrying said matrix under, and away from said platen.

16. The apparatus of claim 15, wherein each of said pins comprises a sensing probe tip.

17. The apparatus of claim 11, which further comprises:
   a controllable electronic module simultaneously feeding bi-directional driving signal to said first, second and third motors; and
   a data processor programmed to control said electronic module.

18. The apparatus of claim 17, wherein said data processor and controllable electronic module comprise:
   computer programs to generate first repetitively alternating sequences of forward and backward driving impulses for said first motor, second repetitively alternating sequences of forward and backward driving impulses for said second motor and third repetitively alternating sequences of forward and backward driving impulses for said third motor; and
   means for varying the phases between said first, second and third sequences.

19. The apparatus of claim 18, wherein said data processing and controllable electronic module comprise program routines for discretely varying the frequency of said impulses in each of said sequences.

20. The apparatus of claim 18, wherein said data processor and controllable electronic module further comprise program routines for varying the duration of said sequences.

21. A method for multidirectionally translating a plurality of parts on the surface of a platen, said method comprising:
   simultaneously imparting to said platen a first reciprocating horizontal motion along a first axis and a reciprocating vertical motion, said motions having a common frequency and a phase relationship;
   selectively adjusting said phase relationship over a continuous 360° range; and
   selectively adjusting said frequency over a continuous range of 1 to 60 Hertz.

22. The method of claim 21, wherein said step of imparting comprises:
   coupling a first horizontally translatable first carriage mounting said platen to a first stepping motor; and
   coupling a second carriage mounting said first carriage and being vertically translatable to a second stepping motor.

23. The method of claim 21, which further comprise imparting a second reciprocating horizontal motion to said platen along an axis perpendicular to said first reciprocating movement.

24. The method of claim 23, wherein said step of imparting a second reciprocating horizontal motion comprises:
   coupling a third horizontal transferable carriage mounting said first carriage to a third stepping motor; and
   supporting said first and third carriages with said second carriage.

25. An apparatus for transporting and sorting small articles which comprises:
   a platen shaped and dimensioned to hold a plurality of said small articles;
   a first carriage mounting said platen;
   a second carriage movably supporting said first carriage;
   transport means between said first and second carriage allowing sideways translation of said first carriage about a first axis in reference to said second carriage over a first given range;
   a supporting base movably supporting said second carriage;
   transport means between said supporting base and said second carriage allowing upward and downward translation of said second carriage about a second axis perpendicular to said first axis in reference to said supporting base over a second given range;
   first means mounted on said second carriage and coupled to said first carriage for translating rotational movement to linear movement;
   first stepping motor driving said first means for translating;
   second means mounted on said supporting base and coupled to said second carriage for translating rotational movement to linear movement;
   second stepping motor driving said second means for translating;
   a controllable electronic module simultaneously feeding bi-directional driving signal to said first and second motors; and
   a data processor programmed to control said electronic module and selectively varying the phase between said bi-directional signals.

26. The apparatus of claim 25, wherein said data processor comprises computer program routines to vary the frequency, amplitude and duration of said bi-directional signals.

* * * * *